US010325402B1

(12) United States Patent
Wang et al.

(10) Patent No.: US 10,325,402 B1
(45) Date of Patent: Jun. 18, 2019

(54) VIEW-DEPENDENT TEXTURE BLENDING IN 3-D RENDERING

(71) Applicant: A9.com, Inc., Palo Alto, CA (US)

(72) Inventors: Yuting Wang, Mountain View, CA (US); Himanshu Arora, San Jose, CA (US); Arnab Sanat Kumar Dhua, Mountain View, CA (US)

(73) Assignee: A9.COM, INC., Palo Alto, CA (US)

( * ) Notice: Subject to any disclaimer, the term of this patent is extended or adjusted under 35 U.S.C. 154(b) by 305 days.

(21) Appl. No.: 14/802,852

(22) Filed: Jul. 17, 2015

(51) Int. Cl.
| | |
|---|---|
| *G06T 7/30* | (2017.01) |
| *G06T 7/73* | (2017.01) |
| *G06T 15/04* | (2011.01) |
| *G06T 15/08* | (2011.01) |
| *G06T 15/20* | (2011.01) |
| *G06T 15/50* | (2011.01) |
| *G06T 17/20* | (2006.01) |

(52) U.S. Cl.
CPC ............ *G06T 15/205* (2013.01); *G06T 15/04* (2013.01); *G06T 15/08* (2013.01); *G06T 15/503* (2013.01); *G06T 17/205* (2013.01); *G06T 7/30* (2017.01); *G06T 7/75* (2017.01); *G06T 2215/16* (2013.01); *G06T 2219/012* (2013.01); *G06T 2219/2004* (2013.01); *G06T 2219/2008* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 6,750,873 B1* | 6/2004 | Bernardini | G06T 15/04 345/581 |
| 2007/0035706 A1* | 2/2007 | Margulis | G03B 21/20 353/122 |
| 2014/0375633 A1* | 12/2014 | Dillard | G06T 15/04 345/420 |
| 2015/0016712 A1* | 1/2015 | Rhoads | G06K 9/00208 382/154 |
| 2015/0145891 A1* | 5/2015 | Kuffner | G06T 3/60 345/649 |
| 2015/0243069 A1* | 8/2015 | Knoblauch | G06T 15/04 345/420 |

* cited by examiner

*Primary Examiner* — Aaron M Richer
*Assistant Examiner* — Khoa Vu
(74) *Attorney, Agent, or Firm* — Hogan Lovells US, LLP

(57) ABSTRACT

Various approaches discussed herein enable providing accurate 3D visualizations of an object at arbitrary viewpoints by identifying portions of geometric mesh data (e.g., triangles of a triangular mesh) associated with the object and determining instances of image data (e.g., high-resolution image data) in which the portions of geometric mesh data are viewable, the instances captured at various viewpoints surrounding the object. The instances of image data are modified based on mappings between the various viewpoints, such that features of a texture generated for a pixel location of the 3D visualization are based on accurate pixel locations of the modified instances of image data, offering a clear rendering of the object without misalignment artifacts.

20 Claims, 10 Drawing Sheets

VIEW-DEPENDENT TEXTURE BLENDING IN 3-D RENDERING

BACKGROUND

People are increasingly doing their shopping "online," such as by using electronic marketplaces that are accessible all day, every day, without need for people to transport themselves to a "brick and mortar" physical location. Such online marketplaces cannot offer the experience of holding, touching, and trying on clothes, for example, prior to purchase. To offset this inherent disadvantage, many online marketplaces utilize high-resolution photographs of the products they have for sale, often from numerous angles and sometimes in various lighting conditions, using multiple models for clothes, etc. Some online marketplaces also utilize user-submitted photographs and videos, both professional and from users, of the products for sale, along with animations and other visual representations designed to replicate as much of the "in-person" feel and advantage as possible. While these approaches are an effective way to convey information about a product, they still suffer when compared to the ability to hold a product, view it from different angles and viewpoints, rotate the product and look closely at it, for example.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for providing a 3D visualization of an object. In particular, various embodiments enable interpolation between viewpoints of an object, according to an underlying estimated coarse geometric structure of the object, for example by modifying original images of the object taken from various viewpoints around the object, and basing a texture applied to the 3D rendering on common portions of the modified original images.

Various approaches discussed herein enable providing accurate 3D visualizations of an object at arbitrary viewpoints by identifying portions of geometric mesh data (e.g., triangles of a triangular mesh) associated with the object and determining instances of image data (e.g., high-resolution image data) in which the portions of geometric mesh data are viewable, the instances captured at various viewpoints surrounding the object. The instances of image data are modified based on mappings between the various viewpoints, such that features of a texture generated for a pixel location of the 3D visualization are based on accurate pixel locations of the modified instances of image data, offering a clear rendering of the object without misalignment artifacts.

Accordingly, approaches in accordance with various embodiments improve the operation and performance of the computing device(s) on which they are implemented and with which they communicate wirelessly by, among other advantages, increasing the accuracy of 3D visualizations by ensuring that colors of the visualization are accurately rendered, as well as improving the performance of 3D rendering by, for example, pre-computing a relationship between various camera capture viewpoints and the corresponding instances of image data, such that transformations and modifications of the instances of image data may be don't in real-time as a user requests different arbitrary viewpoints of the object. Various other applications, processes, and uses are presented below with respect to the various embodiments, each of which improves the operation and performance of the computing device(s) on which they are implemented.

Figure 1:
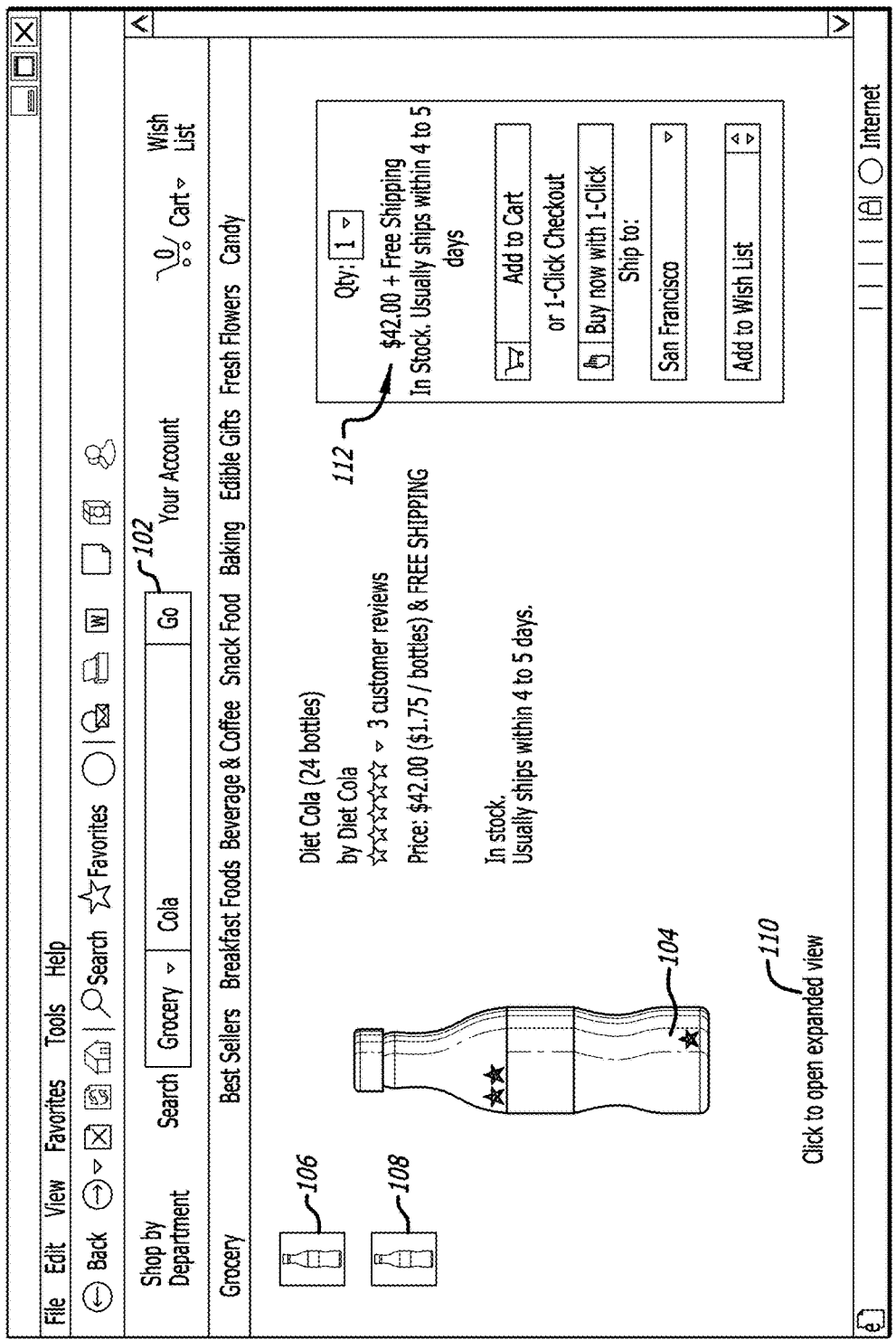
FIG. 1 illustrates an example product page displaying an item available for purchase from an electronic marketplace, in accordance with various embodiments.

FIG. 1 illustrates an example product page 100 for an example product 104 available for purchase from an electronic marketplace in accordance with various embodiments. While shopping online, users are interested in knowing as much information as possible about a product they are interested in purchasing. For example, a user can search for product 104 by providing the name or title of product 104 in search field 102, view multiple views (106, 108) of product 104, view enlarged versions 110 of product 104, and add product 104 to virtual shopping cart 112 to purchase product 104. Electronic marketplaces go through extensive procedures to gather and provide product information, of which, product visualization is one of the most important. Many of these electronic marketplaces enable users to view high-resolution images, videos, or animations of products. These mediums are an effective way to view the product, but are lacking in at least a few respects, such as not provide a way to interact with the product, move the product around, view the product from different angles and zoom levels, and the like.

In order to overcome some of these disadvantages, some electronic marketplaces have attempted to provide three-dimensional (3D) models of product. Various types of data and techniques can be used to create 3D models of an object. Each of these types and techniques has their own pros and cons. Most techniques, however, begin with capturing image data with a set of color camera images of the object taken from arbitrary viewpoints. In computer vision literature, techniques such as Structure from Motion (SFM), Visual Simultaneous Localization and Mapping (Visual SLAM), and Bundle Adjustment (BA) match salient points in these images, or image features to simultaneously estimate relative viewpoints of cameras from which the images are taken, along with a sparse structure of the object. Sparse structure however is not suitable to create a photorealistic rendering needed for visualization and interaction. Other techniques augment cameras with 3D time-of-flight sensors (e.g., LIDAR). While such setups can generate high quality 3D models, they require extensive calibration and long capture times.

Figures 2A, 2B:
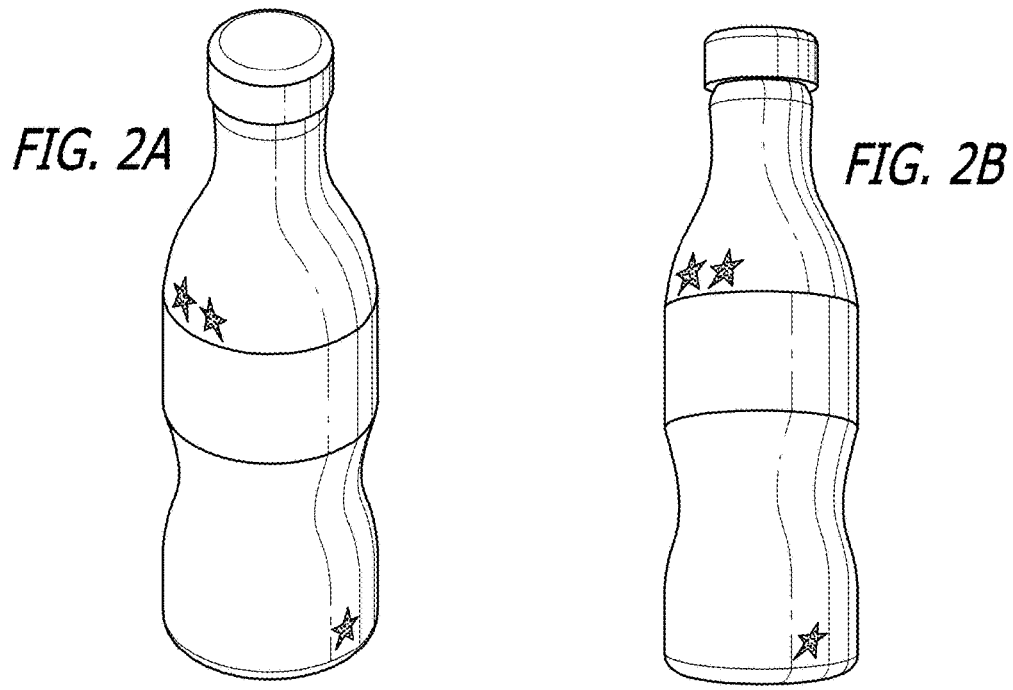
FIG. 2A-2B illustrates example three-dimensional views of products displayable by an electronic marketplace, in accordance with various embodiments.

FIGS. 2A-2B illustrate two example 3D views of product 104 displayable by an electronic marketplace in accordance with various embodiments. In this example, FIG. 2A illustrates a downward perspective view and FIG. 2B illustrates an upward perspective view of product 104. These views would not be possible using single images and a video or animation may provide a similar view, but the user may have to wait for that view to be displayed, as opposed to immediately manipulating the 3D product to the view and/or perspective of the user's choice.

As discussed above, various types of data and techniques have been used to create 3D models, where each has their own set of pros and cons. Examples of these techniques generally begin with capturing image data with a set of color camera images of the object taken from arbitrary viewpoints. Salient points or features between images can be matched using techniques such as Structure from Motion (SFM), Visual Simultaneous Localization and Mapping (Visual SLAM), and Bundle Adjustment (BA) to estimate relative camera viewpoints along with a sparse structure of the object. Sparse structure, however, is not suitable to create a photorealistic renderings needed for visualization and interaction. Other techniques augment cameras with 3D time-of-flight sensors (e.g., LIDAR). While such setups can generate high quality 3D models, they require extensive calibration and long capture times. Accordingly, such disadvantages of these approaches may be overcome using commercially available sensors that simultaneously capture real-time depth and color data that are pre-calibrated to provide pixel resolution depth data. This pixel resolution depth data enables the creation of dense 3D models and the registered color data enables the rendering of these models with photo-realistic texture. Additionally, such a setup is easily replicable, enabling scaling of the data capture process for a large number of products. Since, however, the color imagery from such a sensor may not be of a high-enough quality, the image data in some approaches is augmented with a hi-resolution camera. Accordingly, the depth data from sensor is mapped to a hi-resolution camera using matching features between the registered color data from the sensor and the high resolution images from the camera to determine (x, y, z) coordinates for the high resolution images.

Different applications and object geometries dictate different 3D modeling requirements. For example, using models for matching against user images may only require a coarse structure of the object. Such a model can be provided using simpler algorithms, whereas, enhancing the user experience for visualization and interaction requires high quality photo-realistic rendering of a model that requires a more complex algorithm. Similarly, different product geometries and materials can require different complexities in algorithms and systems to create these models. For example, generating a model for a box of cereal (e.g., a cuboid made of cardboard/paper) is much easier than a bag of chips in transparent packaging. Various techniques for generating coarse models that cater to wide categories of products, such as cuboids and cylindrical objects, have been developed to simplify the process for these shapes. Accordingly, the algorithms utilize different available geometric and photometric constraints ingrained in the capture setup, thus, enhancing the robustness of the entire system.

Figure 3:
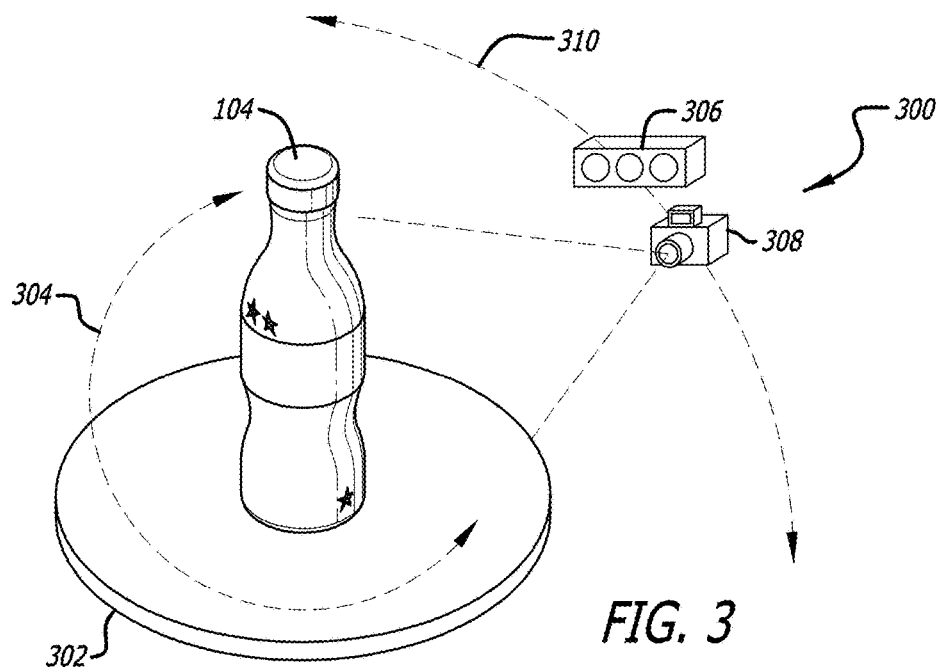
FIG. 3 illustrates an example data capture setup for capturing images of products from various angles and elevations, in accordance with various embodiments.

FIG. 3 illustrates an example data capture station 300 for capturing images of products from various rotation angles 304 and elevations 310 in accordance with various embodiments. Data capture station 300 consists of a rotation platen 302 on which product 104 is placed. Platen 302 is connected to a computer controlled servo motor. A sensor bundle including, for example, the depth sensor and the camera is placed on an arc going from the side of platen 302 corresponding to a side elevation view to the top of the arc corresponding to a top view of product 104. The motion of the sensor bundle along the arc is controlled by another servo motor. A programmable interface, in this example, can be created to control the rotation of platen 302, the elevation of the sensor bundle, the zoom/focus of the sensors (306, 308), and to capture the images. Platen rotation or camera elevation change simulates the scenario where product 104 is stationary and the sensor bundle is changing its viewpoint.

Figure 4A:
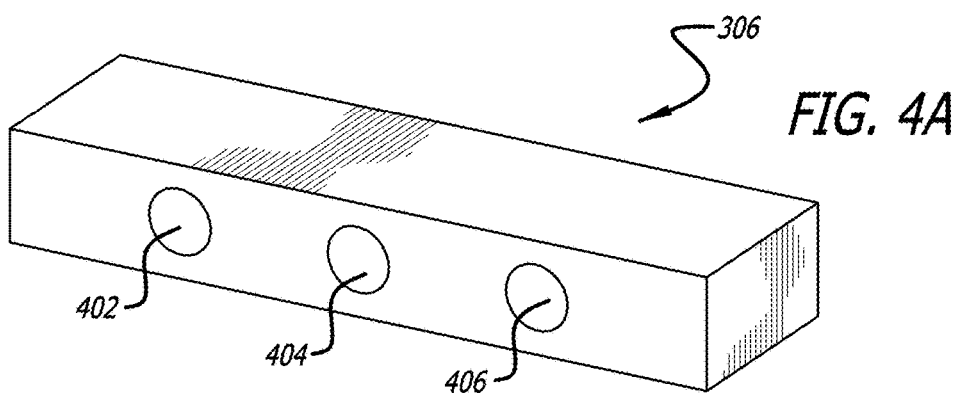
FIG. 4A illustrates an example depth sensor for capturing three-dimensional data for a product, in accordance with various embodiments.
Figure 4B:
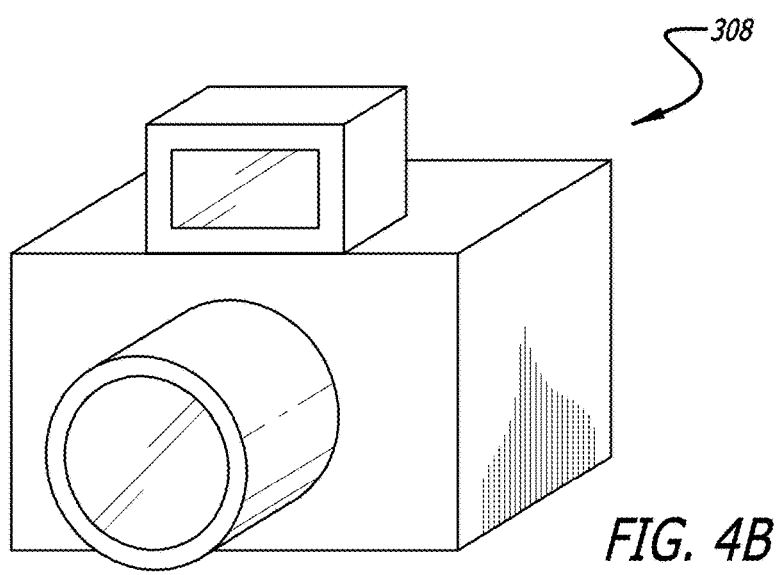
FIG. 4B illustrates an example high resolution camera for capturing high resolution image data for a product, in accordance with various embodiments.

As mentioned above, sensor 306 simultaneously captures pre-registered depth and color images of object 104, in this example, from different camera viewpoints or rotation angles 304. FIG. 4A illustrates an example depth sensor 306 for capturing three-dimensional data for a product in accordance with at least one embodiment. Sensor 306 includes infrared (IR) emitter 402 and IR depth sensor 406. IR emitter 402 emits infrared light and depth sensor 406 detects and reads IR beams that are reflected back. The reflected beams are converted into depth information measuring the distance between an object and sensor 306. Additionally, sensor 306 includes a RGB color model-based (RGB) color sensor 404 that stores data enabling color image data capture. Thus, IR depth sensor 406 and RGB color sensor 404 are pre-registered and calibrated enabling, for example, an (x, y, z) coordinate of a point in an two-dimensional image captured using RGB color sensor 404 to be known based on a pre-determined mapping. For such commercially available sensors, the color images are of a relatively low resolution and, thus, not suitable for rendering on top of (or projecting onto) a model. Thus, the capabilities of sensor 306 may be augmented with a high-resolution single-lens reflex camera (SLR) color camera, for example, placed rigidly with respect to sensor 306 in data capture station 300. Accordingly, FIG. 4B illustrates an example high-resolution camera 308, such as a single-lens reflex camera (SLR) for capturing high-resolution image data for a product in accordance with at least one embodiment. Thus, sensor 306 and high-resolution camera 308 may be mounted in a fixed position relative to each other on a mechanical arc of data capture station 300.

Existing approaches to 3D modeling and rendering attempt to create an accurate 3D model based on multiple stationary pictures of the item desired to be rendered, and use various approaches to "stitch" these images together to render the object from various viewpoints. Objects with arbitrary geometries often provide the most difficult task of rendering. Drawbacks of these approaches include inaccuracies in the estimated geometry, which can lead to misalignment in the texture maps generated based on the estimated geometry, which when projected onto the 3D models, can result in artifacts making the rendered image unacceptable to users. These artifacts can include blurring, inconsistent color reproduction, and the like.

The techniques described herein provide solutions to those and other problems related to current approaches for rendering and generating 3D models of objects. Example embodiments provide approaches for interpolating between viewpoints at which high-resolution RBG image data is captured, according to an underlying coarse geometric structure of the object, modeled pursuant to various 3D modeling techniques, as described herein. According to various embodiments, input data includes the coarse geometric structure of the object (e.g., 3D point cloud, geometric mesh such as a triangle mesh, etc.), high-resolution RGB image data of the object taken at various viewpoints, and data indicating the viewpoints of the camera at which the image data is captured, and other data as described more fully herein.

According to various embodiments, an item may be rendered in 3D from any arbitrary viewpoint, without incurring artifacts and imperfections, by interpolating between images represented by the image data using "optical flow" techniques, as described more fully herein. The result is a clear and accurate rendering of the item without misalignment artifacts, with the original high-resolution image data being utilized when the item is rendered from original viewpoints.

Figure 5:
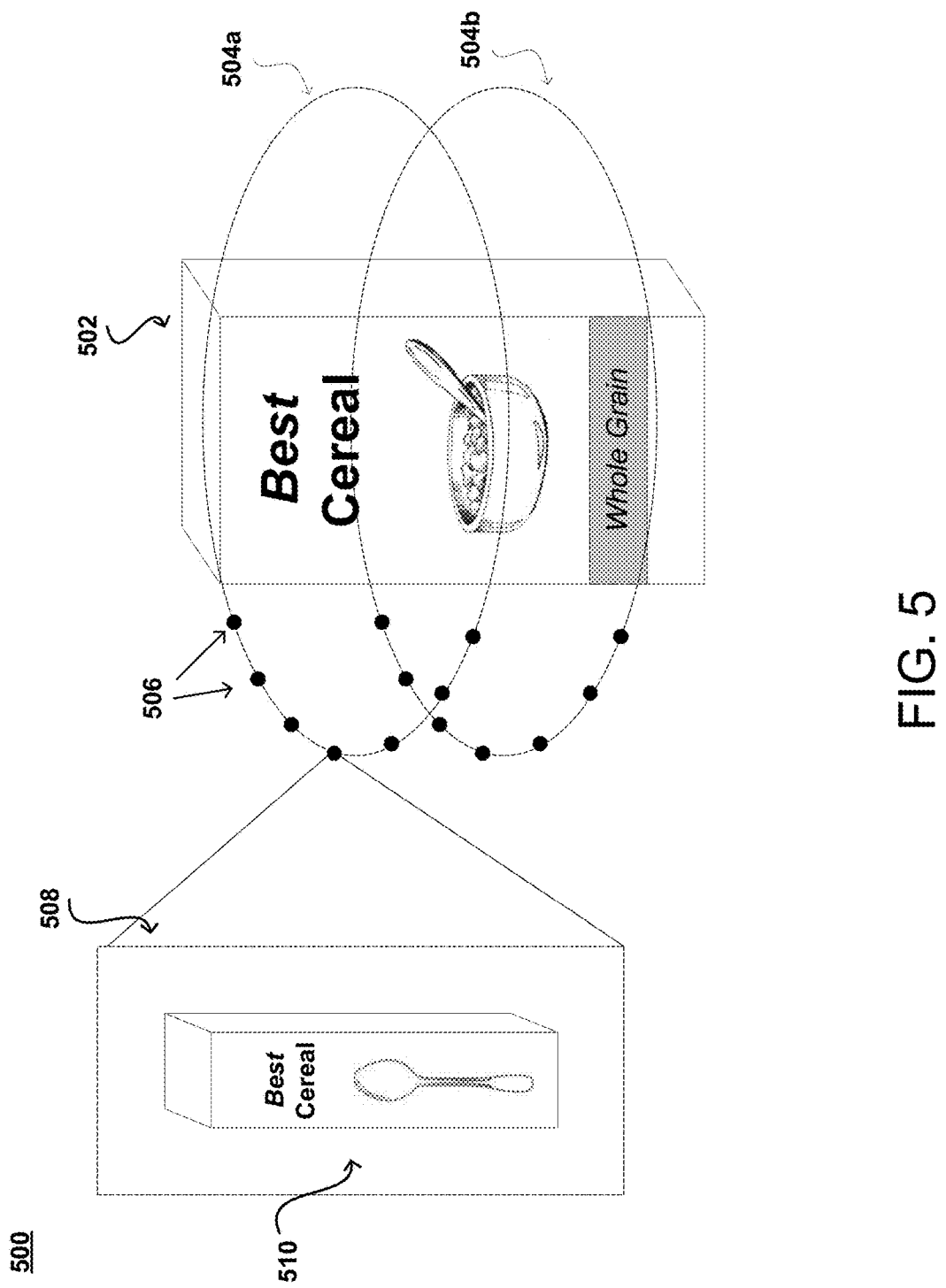
FIG. 5 illustrates an example data capture approach for capturing images of products from various angles and elevations in accordance with various embodiments.

FIG. 5 illustrates an example data capture approach 500 for capturing images of products from various angles and elevations in accordance with various embodiments. As discussed with regard to FIG. 3, various components such as depth sensors and high-resolution cameras may be used in various approaches for capturing the data utilized in 3D modeling and rendering. In FIG. 5, these types of approaches are discussed in more detail. An item 502, such as a product for sale (e.g., cereal) may have various data captured to aid in the 3D modeling and rendering process. As described with regard to FIG. 3, the item 502 may be rotated on a platen (not shown) while sensor and image data is captured by various equipment (not shown), or the equipment may move around item 502 in order to capture data from various perspectives and angles, etc. In the example of FIG. 5, the data capture equipment operates to capture data about item 502 at multiple viewpoints. For example, there may be two sets of sensor capture equipment (e.g., a depth sensor and a high-resolution camera), each positioned to capture data on various elevations around a circumference 504a, 504b around item 502. For example, each camera may take a photograph every 10 degrees of rotation around item 502. At two different elevations, this would result in 72 pictures ((360 degrees/10=36)*2). Other embodiments may capture more or less data, depending on various circumstances.

Each capture point 506 may be considered a "viewpoint." For example, image data captured at zero degrees of rotation may coincide with a direct frontal view of item 502, while image data captured from 90 degrees 508 may represent a side view 510 of item 502. Any number of viewpoints 506 may be utilized according to various embodiments. Previous approaches to 3D modeling and rendering merely display the "closest" image data associated with a viewpoint requested by a user. For example, a user may be viewing a product, such as in the example of FIG. 1. Through use of various controls, the user may rotate a 3D rendering of the product. Starting at zero degrees, the user may rotate around the product. If the rendering is based on a data capture scenario similar to FIG. 5, then there will be 36 images represented by image data captured at 10-degree intervals around the circumference of the product. As the user rotates her view in the user interface element, one of the 36 images will be displayed, depending on which image best corresponds to the requested viewpoint. While this may provide some degree of 3D viewing experience, it does not provide a view-independent, flexible, zoomable approach to 3D rendering, as provided by the techniques described herein.

Figure 6:
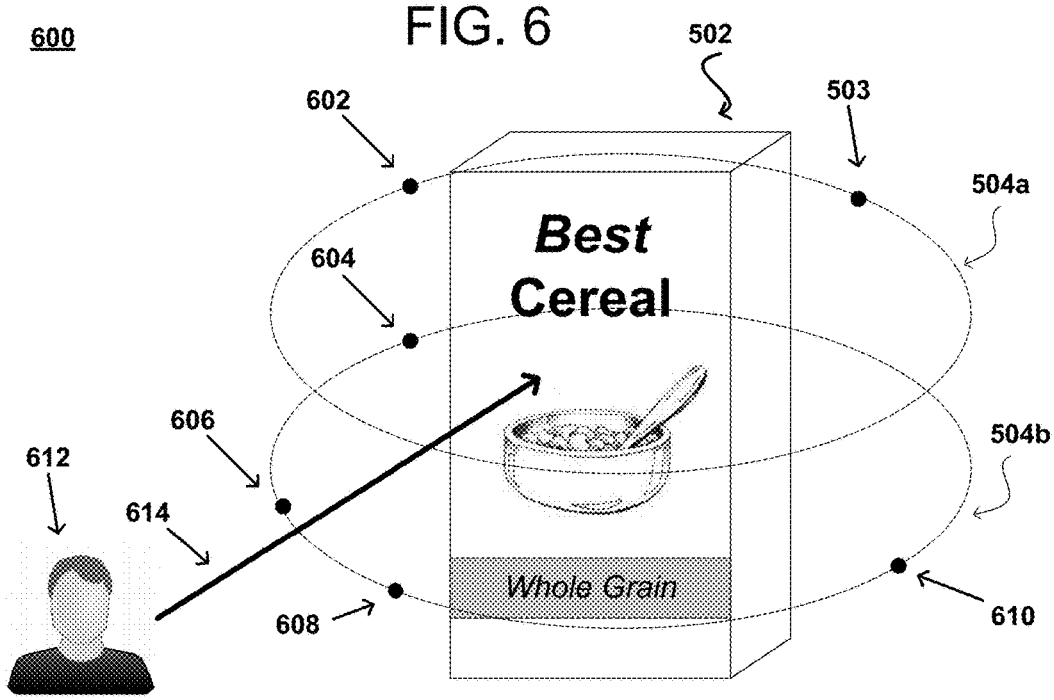
FIG. 6 illustrates an example of a requested viewpoint in relation to fixed image data capture viewpoints, in accordance with various embodiments.

FIG. 6 illustrates an example 600 of a requested viewpoint in relation to fixed image data capture viewpoints, in accordance with various embodiments. For example, FIG. 6 illustrates an environment 600 similar to that of FIG. 5, but with the addition of a user 612 and a requested viewpoint 614. With FIG. 6, and with additional figures discussed herein, it should be understood that reference numbers may be carried over between figures for similar components for purposes of explanation, but that such use should not be interpreted as a limitation on the various embodiments.

In the example of FIG. 6, an item 502 has been modeled by taking depth data and/or high-resolution image data of item 502 at various viewpoints (602, 603, 604, 606, 608, 610) around the item 502. While six viewpoints chosen from two different elevations 504a, 504b are shown with regard to FIG. 6, any number of viewpoints and/or elevations may be utilized for data capture, according to various embodiments. While the viewpoints of FIG. 6 may have been taken at regular, fixed intervals, a user desiring to interact with a 3D rendering of the item 502 may not want to be constrained to viewing the item 502 at such fixed intervals, and may not be satisfied with a rendering containing texturing artifacts if the user desires to see the item 502 at a viewpoint of 37 degrees on the x axis and 72 degrees on the y axis, a viewpoint for which no existing viewpoint provides pristine image data and for which an interpolation is required. This scenario is illustrated in FIG. 6 by a user 512 requesting a particular viewpoint 614 of the item 502, for example in an environment similar to that illustrated with regard to FIG. 1. Because none of the existing camera capture viewpoints (602, 603, 604, 606, 608, 610) match the requested viewpoint received from the user, some degree of interpolation in the 3D model is required for the texturing to not contain artifacts.

According to various embodiments, multiple data inputs are provided for the techniques described herein. For example:

1) Total number of camera capture viewpoints (N). This may represent each instance of image data captured by a high-resolution camera (e.g., a RBG SLR, a video camera, etc.). As described earlier, this may include images taken at every 10 degree interval around an item, at two different elevations, for a total of 72 images (camera capture viewpoints).

2) The projection matrix of the camera (K). According to an embodiment, a depth image $D_i$ for i-th viewpoint stores the perpendicular distance between the camera plane of sensor 306 of FIG. 3, and a physical point corresponding to each pixel $L_i$. This is same as the z-coordinate for an image frame centered at the low resolution camera of sensor 306, xy-plane along a sensor plane, and a z-axis jutting out of the sensor. Manufacturer-provided calibration parameters contain the focal lengths $(f_x, f_y)$ and optical center $(c_x, c_y)$ of the low resolution camera, which are used to obtain the intrinsic camera projection matrix K that relates a 3D point (X, Y, Z) in a reference frame centered at the camera to its corresponding image projection (x, y). Given the projection matrix and depth data for each pixel, its corresponding 3D point can be estimated as follows:

$$K = \begin{bmatrix} f_x & 0 & c_x \\ 0 & f_y & c_y \\ 0 & 0 & 1 \end{bmatrix} \Rightarrow \alpha \begin{bmatrix} x \\ y \\ 1 \end{bmatrix} = K \begin{bmatrix} X \\ Y \\ Z \end{bmatrix} \Rightarrow \begin{bmatrix} X \\ Y \\ Z \end{bmatrix} = Z \cdot K^{-1} \begin{bmatrix} x \\ y \\ 1 \end{bmatrix}$$

In various embodiments, an extrinsic projection matrix, which is a 3×4 matrix that relates a 3D point in an arbitrary reference frame to its 2D projection in an image, may be used. Since sensor 306 and high resolution camera 308 (from FIG. 3) are placed rigidly with respect to each other, the projection matrix remains constant for all viewpoints. However, since sensor 306 and high resolution camera 308 capture image data from slightly different angles, they will each have a slightly different field of view. Thus, in order to estimate this projection matrix, image features suitable for matching are extracted from a low resolution image from sensor 306 and high resolution image from high resolution camera 308 from an overlapping field of view. Image features are usually detected at salient locations (e.g., corners and blobs in an image) and described as a characteristic vector using the color content around the location. Any feature extraction algorithm can be used to extract image features (e.g., Scale-invariant feature transform (SIFT), Speeded Up Robust Features (SURF), Accumulated Signed Gradient (ASG), etc.).

3) A high-quality image taken from each viewpoint ($\{I_i\}_{i=1}^{N}$), where N is equal to the number of camera capture viewpoints. For example, a high-resolution image may be taken at each camera capture viewpoints (602, 603, 604, 606, 608, 610) of FIG. 6, where if those were the entire number of camera capture viewpoints, N would equal 6.

4) A camera pose, described as a rotation matrix and translation vector for each viewpoint ($\{R_i, t_i\}_{i=1}^{N}$). For example, in the example of FIG. 6, given six total camera capture viewpoints (N=6), then for camera capture viewpoint 602, the rotation matrix and translation vector would be $\{R_1, t_1\}$, for camera capture viewpoint 604, the rotation matrix and translation vector would be $\{R_2, t_2\}$, and so forth. While these are the camera configurations, the arbitrary viewpoint 614 requested by the user 612 may be represented by $\{R, t\}$.

5) A geometric mesh of the item (e.g., a triangular mesh). According to various embodiments, a triangular mesh of the item is generated, for example from a 3D point cloud. Poisson mesh creation is a suitable algorithm for generating meshes for closed surfaces, according to various embodiments, although any known meshing approach to create a closed mesh, for example out of point clouds, will suffice. In an embodiment, the geometric mesh is a closed set of triangles and shading that describes a geometry of the item to be rendered.

Once a mesh is obtained, a texture based on the high-resolution images may be projected (mapped) onto the mesh. For each triangle, the colors making up the pixels of the triangle are defined from the high-resolution images, and a correspondence between the images and the geometry allows the colors to be mapped onto the geometry.

Figure 7:
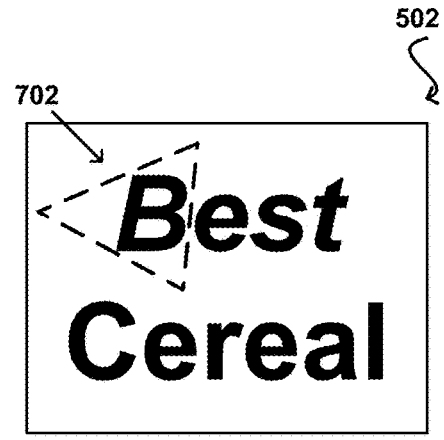
FIG. 7 illustrates an example of a triangular mesh as utilized in relation to the disclosed techniques, in accordance with various embodiments.

FIG. 7 illustrates an example 700 of a triangular mesh as utilized in relation to the disclosed techniques, in accordance with various embodiments. While any type of geometric mesh may be utilized, a triangular mesh is described with respect to various embodiments. In the example of FIG. 7, item 502 (from FIGS. 5 and 6) is shown at a zoomed-in level, and an example of a triangle 702 comprising part of the triangular mesh that represents the 3D geometry of item 502. The size of the example triangle 702 of FIG. 7 is for illustrative purposes; it should be understood that an actual triangular mesh comprising the geometry of item 502 may be comprised of thousands to millions of individual triangles. In the example triangle 702 of FIG. 7, the letter "B" is a texture that is mapped onto the triangle, for example from the high-resolution images of item 502 discussed earlier. The underlying triangle as illustrated in FIG. 7 is a geometric representation, not a texture.

Figure 8:
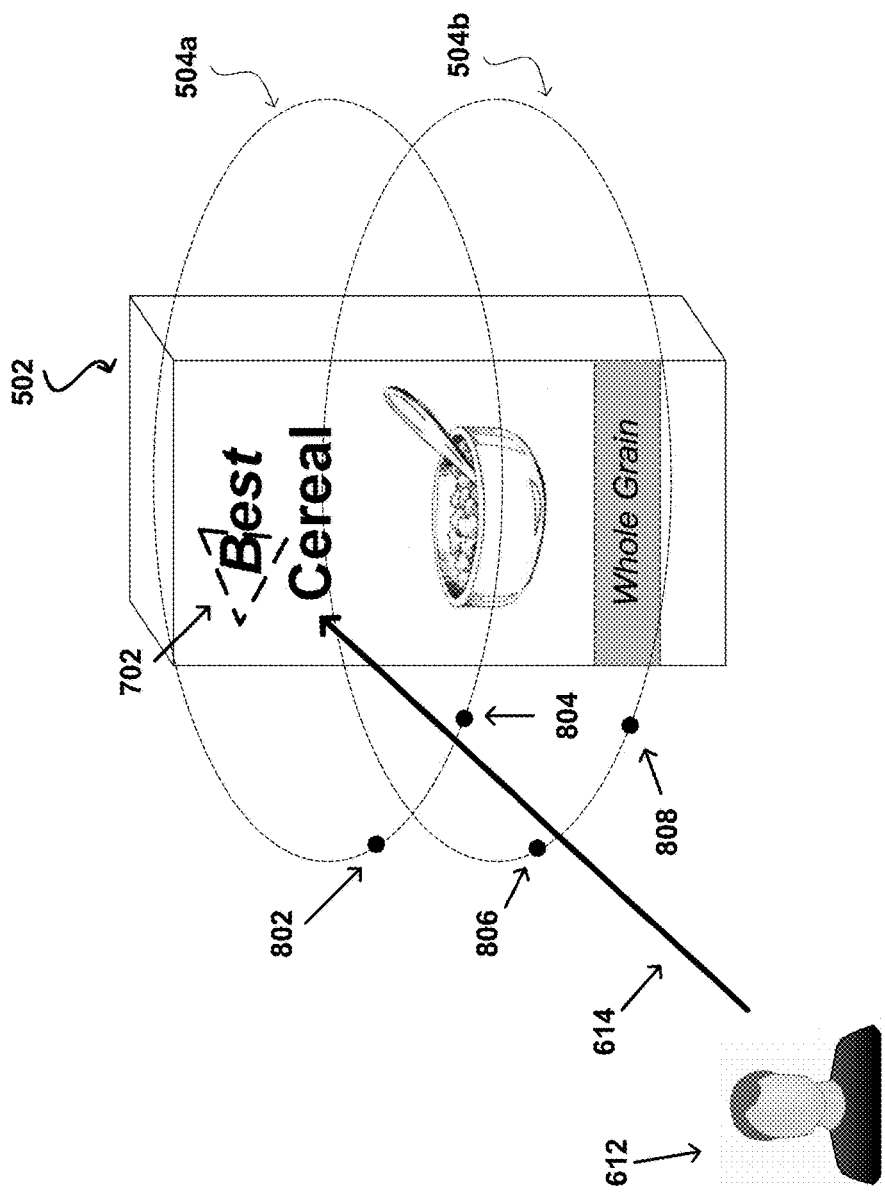
FIG. 8 illustrates an example of a selection process for neighboring viewpoints to the requested viewpoint, in accordance with various embodiments.

FIG. 8 illustrates an example 800 of a selection process for neighboring viewpoints to the requested viewpoint, in accordance with various embodiments. In the example of FIG. 8, the 3D rendering of item 502 is displayed, and a user 612 has requested a particular viewpoint 614 at which to view the rendering, which is to be rendered according to the underlying geometric model (e.g., triangular mesh) and textured with the high-resolution image data based on embodiments of the techniques described herein. In this example, user 612 has requested to view a particular viewpoint of item 502, which is not a viewpoint from which any of the high-resolution image data has been previously captured, as described earlier within.

According to an embodiment, given the requested viewpoint, all triangles of the triangular mesh that are going to be viewable from the requested viewpoint are determined, and given that set of potential triangles, it is determined which of those triangles are viewable (represented) in the image data captured at the various camera capture viewpoints. In the example of FIG. 8, there is only one triangle 702 identified as being viewable from the requested viewpoint 614; however, it should be understood that this is for illustrative purposes, as any number of triangles may be identified as viewable, given an arbitrary viewpoint requested by a user. Given this example triangle 702 in FIG. 8, and the user requesting a viewpoint 612 that is not identical to any previously-captured camera viewpoints, a number of neighboring camera capture viewpoints (802, 804, 806, 808) is determined, that will be used to render the viewpoint (e.g., using the color information and the mapping, among other features).

For example, there may be two elevations 504a, 504b at which the high-resolution image data is captured, and as discussed earlier, image data may be captured along each of these elevations at every ten degrees of rotation around the item 502, giving a total of 72 instances of image data (i.e., images). Given the arbitrary viewpoint 614, the closest four camera capture viewpoints (802, 804, 806, 808) to the arbitrary viewpoint 614 are selected in which the triangles of the triangular mesh that are going to be viewable from the requested viewpoint are present. This represents two camera capture viewpoints on each elevation, one being to the immediate left and one being to the immediate right of the requested viewpoint 614, although in other embodiments, the number may be greater or fewer at varying elevations or rotational position. In the example of FIG. 8, one triangle 702 is used for illustrative purposes.

According to various embodiments, given one triangle (such as 702 in FIG. 8, although as discussed earlier, any number of triangles may be utilized), one can determine how the triangle is mapped to the four neighboring camera capture viewpoints because the viewpoint of the neighboring camera capture viewpoints is known. Once the triangle is mapped onto the image data taken at the neighboring camera capture viewpoints, the triangle on the four instances of image data should, hypothetically, encode the same features (e.g., content, color, etc.). For example, if there is a letter "B" in the triangle when it is projected onto one of the image data instances, then the other three images should also contain the letter "B." However, due to estimation errors, inaccuracies in the estimated geometries, and misaligned textures, it is envisioned that in some embodiments the triangles will not encode the identical content.

Example embodiments solve this problem by finding a match between the four (or more, or less) image data instances in order to make the content as identical as possible. The images are transformed to become closer to each other. Given an actual (reference) image and a generated image, a transformation that makes both images the same is determined, and this differencing data is then used to correct for misalignment between the images. This differential-based matching process gives a correspondence between pixels.

At each viewpoint, given a triangle viewable from the viewpoint, it is desired to know how the triangle is mapped to the closest reference images so that the feature (e.g., color) applicable to the triangle may be determined. It is desired for each triangle to determine where it should be mapped to the reference images so that the desired features (e.g., color) will be very close to each other.

Figure 9:
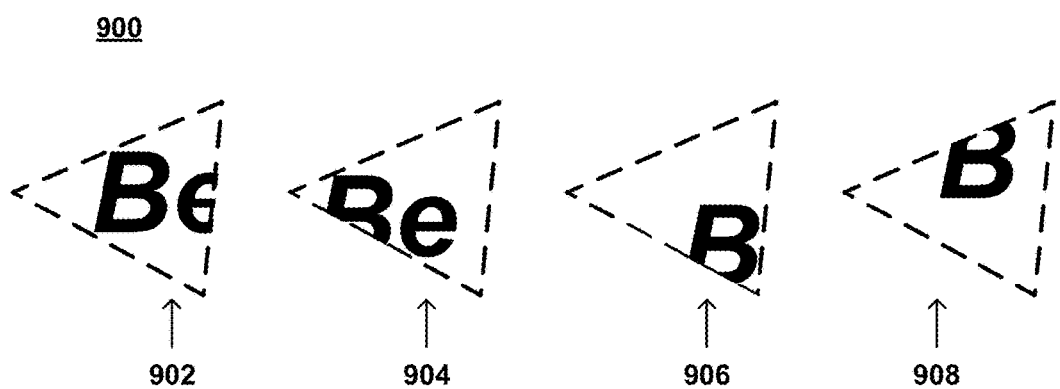
FIG. 9 illustrates an example of triangle mapping to image data, according to various embodiments.

FIG. 9 illustrates an example of triangle mapping to image data, according to various embodiments. In FIG. 9, the example triangle 702 from FIGS. 7 and 8 is shown, as it is mapped to the closest neighboring camera capture viewpoints as illustrated in and discussed with regard to FIG. 8. While the example triangle according to the requested viewpoint only contains a texture of the letter "B," the types of estimation errors that result in artifacts such as misalignment, color inaccuracies, etc., are illustrated as they may manifest with regard to the four neighboring camera capture viewpoints discussed above.

Because none of the triangles (902, 904, 906, 908) as mapped to the image data from each of the four neighboring camera capture viewpoints is identical, a texturing approach which identifies a pixel location common to each image data instance and attempts to use a feature at that location to determine the texture to map onto the rendering may result in artifacts. At each existing camera capture viewpoint, the other three instances of image data will be transformed to bring the content close to each other. This transformation may be pre-computed and stored for each camera capture viewpoint, such that the corresponding data may be used to correct the projection of the triangle associated with the requested viewpoint in real-time. Example embodiments of the transformation approach correct for a feature (e.g., color) at a particular pixel location of the viewpoint by using the other camera capture viewpoints and the corresponding image data to exactly define the location of the pixel, then go back to the image data containing that pixel and extract the feature(s) at that location.

Figure 10:
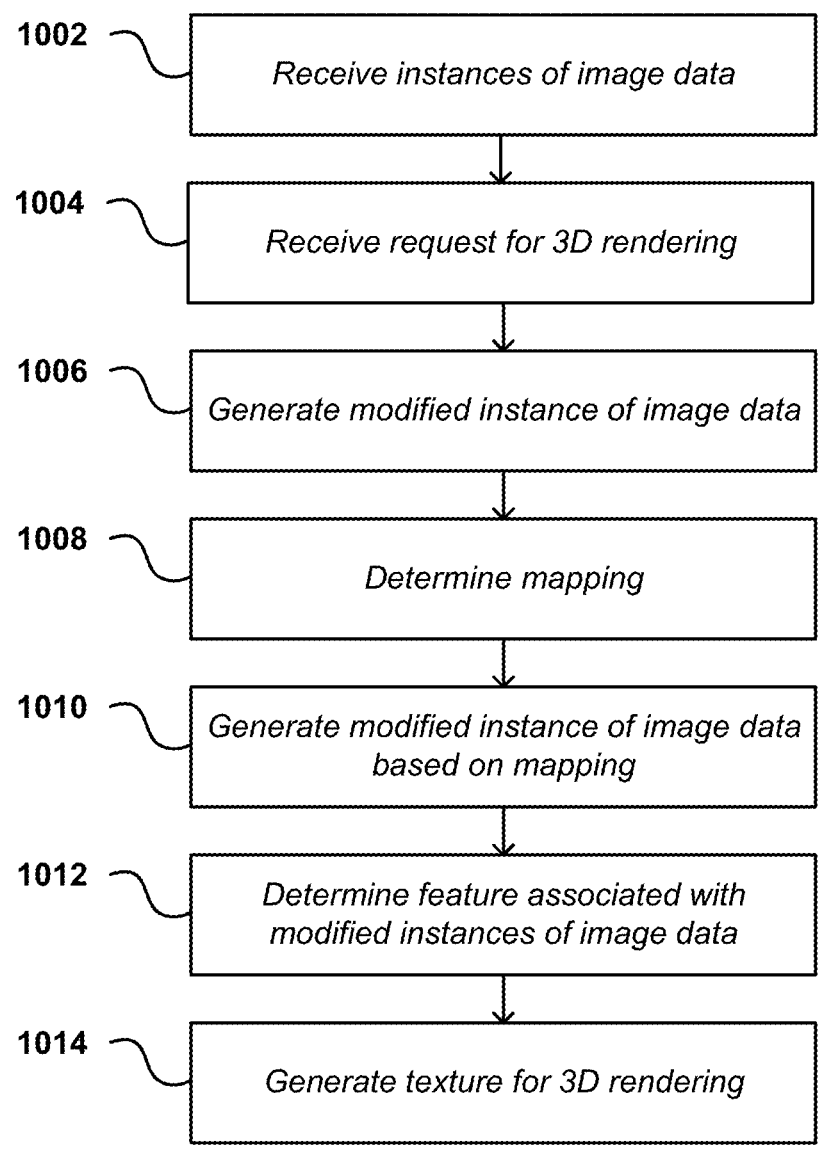
FIG. 10 illustrates an example process for view-dependent texture blending, in accordance with various embodiments.

FIG. 10 illustrates an example process 1000 for view-dependent texture blending, in accordance with various embodiments. It should be understood that, for any process discussed herein, there can be additional, fewer, or alternative steps performed in similar or alternative orders, or in parallel, within the scope of the various embodiments unless otherwise stated. In accordance with various embodiments, instances of image data are received 1002. The instances represent an object and are each captured from a different viewpoint of a particular number of viewpoints. For example, a camera may capture instances of high-resolution image data (i.e., images) at various locations surrounding an object, such as every 10 degrees in circumference, at varying elevations, etc. A request for 3D rendering is received 1004, for example from a user manipulating a 3D controller to view various angles or rotations of the 3D rendering, or to perform other actions such as zooming in or out, for example. In various embodiments, the 3D representation of the object is provided by a geometric mesh or similar approach. For example, triangular mesh data corresponding to a 3D representation or geometric structure of the object is received. This mesh data may be based, for example, on a point cloud generated through various techniques.

According to various embodiments, at least one modified instance of image data is generated 1006, for example by first determining a portion of the 3D representation (e.g., one or more triangles of the triangle mesh data) that is viewable from the requested viewpoint. For example, if a user is requesting a view of direct front of the object, then no triangles comprising the back of the object will be viewable from the requested viewpoint, so those triangles are excluded. Those portions that are viewable are identified and utilized in further processing, either in whole or in part, such as in determining which camera capture viewpoints are implicated in further processing. In various embodiments, based on the requested viewpoint and from which camera capture viewpoints the triangle(s) are viewable, some number of camera capture viewpoints, and their respective instances of image data, are selected. For example, given a setup in which 36 instances of image data are captured at two separate levels of elevation, giving a total of 72 instances of image data, four camera capture viewpoints corresponding to the closest viewpoints to the requested viewpoints, all of which are able to "view" the triangle, are chosen. Any number of camera capture viewpoints may be utilized. If two are so utilized, then the instances of image data associated with the camera capture viewpoints are identified, and a modified version of one of the instances is generated, for example based on a comparison of a location of the triangle in the instance, with a location of the triangle in the 3D representation as projected to the requested viewpoint.

According to various embodiments, the modified instance of image data is generated after, as a result of, or as part of a transformation process. For example, an image may be "transformed" by applying an image processing approach or algorithm (e.g., using transformation matrices at various viewpoints). In various embodiments, a transformation comprises transforming the image coordinates from one viewpoint (e.g., associated with the image captured at that viewpoint) to another viewpoint. As a result, the pixels are in the same coordinate space, but as discussed with regard to FIG. 9, the content associated with that coordinate space (e.g., a triangle in each of the instances of image data) do not match up. In various embodiments, the transformation (or modification) is a geometric transformation of image coordinate data such that one image may be mapped to another image on a shared coordinate system (e.g., a pixel location in one image matches a pixel location in another image).

For example, given an image at a viewpoint and a triangle mesh model, a view matrix may be determined for the viewpoint, which comprises the transformation from the 3D model to the viewpoint (e.g., using a transformation matrix). Based on that, the 3D model may be projected to the image at the viewpoint. By mapping the model to the viewpoint, the content (e.g., color) of the triangle in question may be determined when the 3D model is mapped to the viewpoint.

Based on a mapping between the transformation matrix and another viewpoint, for example, the triangle in question may be mapped to the other viewpoint, and the content (e.g., color) of that triangle determined. As discussed with regard to FIG. 9, because of misalignment (e.g., due to estimation errors in the transformation matrices, etc.), the triangle mapped to the other viewpoint will not have the same content as the triangle mapped to the first viewpoint. By transforming (e.g., transferring) the content between the two viewpoints based on a shared coordinate system, then the differences in the triangles' content may be determined.

A mapping is determined 1008, for example between the remaining instance of image data and the modified version of the other instance, wherein the mapping provides a correspondence between locations (e.g., pixel coordinates, etc.) of the representation of the triangle in the two instances of image data. Based on the mapping, a modified version of the other instance of image data is generated 1010, giving in this example two original instances of image data and two modified versions of the original instances. given a location of the representation of the triangle (e.g., pixel locations), one or more features (e.g., color, tint, shading, etc.) associated with the location in the modified instances are extracted using a feature extraction algorithm (e.g., Scale-invariant feature transform (SIFT), Speeded Up Robust Features (SURF), Accumulated Signed Gradient (ASG), etc.), and used to generate a texture for the 3D rendering. For example, a pixel location of the triangle as textured onto the 3D mesh would be textured using the features extracted from a corresponding location of the modified instances of image data.

Embodiments of the techniques described herein produce accurate 3D models without the attendant artifacts introduced by previous approaches. These artifacts are often caused because of errors in estimating data such as $\{R_i, t_i\}_{i=1}^{N}$ and K, as discussed earlier herein. These estimation errors can result in textures generated based on different image data not to align properly with each other. By deforming/modifying these images based on viewpoint, and using the modified images for texturing instead of the original (misaligned) images, the drawbacks are managed.

For example, for an arbitrary viewpoint, assume image $I_i$ is one of the neighboring image data instances associated with one of the camera capture viewpoints. For each of the other images involved in the rendering, the geometric mesh is textured using b, and it is projected to viewpoint i to get an image $I'_j$. $I_i$ and $I'_j$ will be similar, but slightly misaligned due to, for example, errors in the estimated transformations. A transformation (i.e., optical flow) is computed from $I'_j$ to $I_i$, which in various embodiments returns a vector field $v_j$ defined on each pixel of $I'_j$. Utilizing $v_j$, one may deform/modify $I_i$ along $v_j$, giving $\tilde{I}_j$, as shown by:

$I_i(x+v_j(x))=\tilde{I}'_j(x)$, where x is any pixel location in the image. The relative viewpoint between viewpoints can be described as a 3D Euclidean transformation that includes a rotation and translation.

Figure 11:
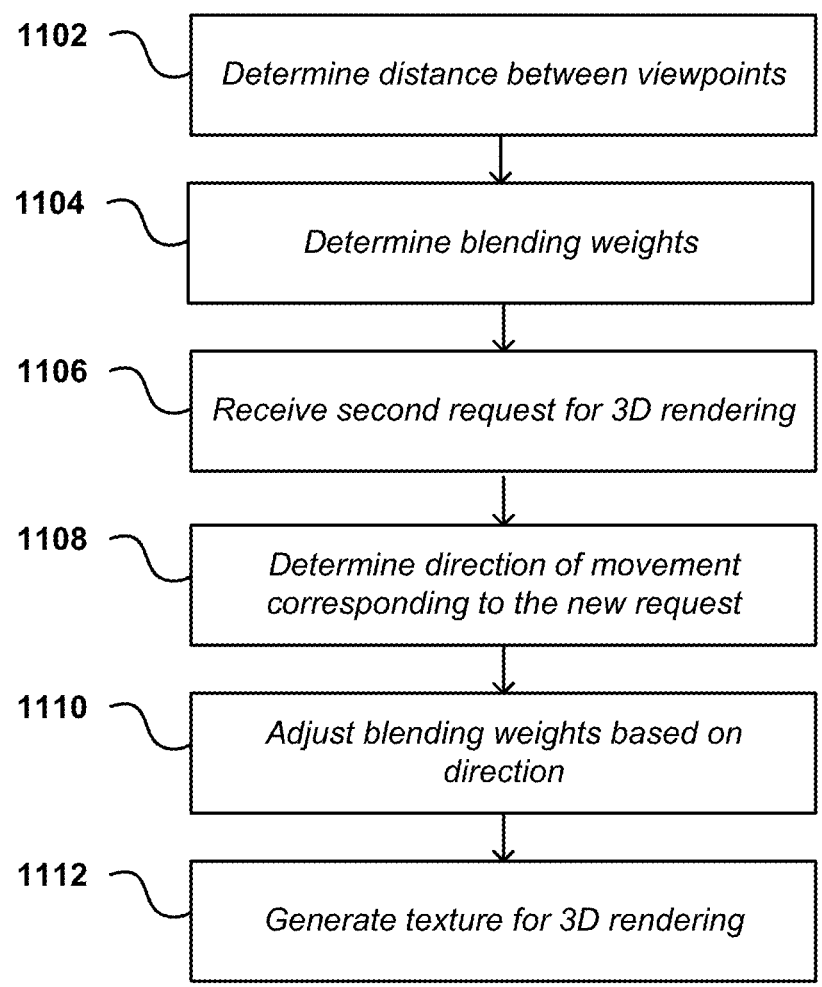
FIG. 11 illustrates an example process for view-dependent texture blending, in accordance with various embodiments.

FIG. 11 illustrates an example process 1100 for view-dependent texture blending, in accordance with various embodiments. A distance between the various camera capture viewpoints and the requested viewpoint is determined 1102. The distance may be any numerical or relative amount capable of distinguishing a magnitude of the difference between the viewpoints. In other embodiments, other criteria could be determined along with or in place of distance. For example, an angle between the viewpoints may be determined, or other comparison criteria suitable for distinguishing a magnitude of the difference between the viewpoints.

Given these determined factors/criteria/measurements, etc., a blending weight is determined 1104 for the feature(s) used with regard to the instances of image data corresponding to the selected camera capture viewpoints. In various embodiments, the texture for the 3D rendering is generated based on the blending weights. For example, if a pixel location corresponding to the particular location at issue in the first instance of image data is one color value, and the pixel location corresponding to the particular location at issue in the second instance of image data is another color value, then the texture generated from the instances will be a blending of the color values, with the color values being blended according to the weight. For example, if one color value receives 80% weight and the other color value receives 20% weight, then the ultimate color value used in the texturing will represent more of the higher-weighted color value. In some embodiments, there is no blending, and the higher-weighted feature is the chosen feature.

In various embodiments, a new request for 3D rendering is received 1106, for example by the user rotating the 3D model a little further to one side. A direction of movement is determined, for example to determine 1008 whether the "new" viewpoint is moving towards one particular camera capture viewpoint. For example, data may be provided by a computing system that allows for the determination. A mouse (or a finger on a trackpad, etc.) may be moved a certain amount, and data provided corresponding to that movement would indicate characteristics associated with the movement, from which data regarding a direction may be determined. For example, a direction vector and magnitude (e.g., length) of a movement along said vector(s) may be provided, from which a direction may be computed. The blending weights may be further modified 1110 based on this determination, for example with the image instance associated with the camera capture viewpoint being "moved towards" receiving an upward adjustment to its blending weight. Other factors may be utilized in the determination, such as speed of movement, etc. Given these modifications, the texture for the 3D rendering is generated 1112.

Any viewpoint may be described by a rotation and translation $\{R, t\}$, together with a camera matrix K, as described earlier, and a mesh projected to a display (e.g., monitor, device screen, etc.). For color information, in various embodiments, the mesh M is textured with a linear blend of the image instance data captured by the camera capture viewpoints neighboring the requested viewpoint. The texturing may be done using image $I_i$ and its transformations $\{R_i, t_i\}$ and K. Blending weights $\{w_i\}$ may be based, as discussed above, on a distance of the requested viewpoint to its neighboring camera capture viewpoints, and/or by tracking how a user is moving between the camera capture viewpoints. Closer images may receive higher weighting. In various embodiments, if the requested viewpoint coincides with a camera capture viewpoint, then the corresponding image data instance may receive the entire weight, so the rendered result will be exactly the same as $I_i$.

Figure 12:
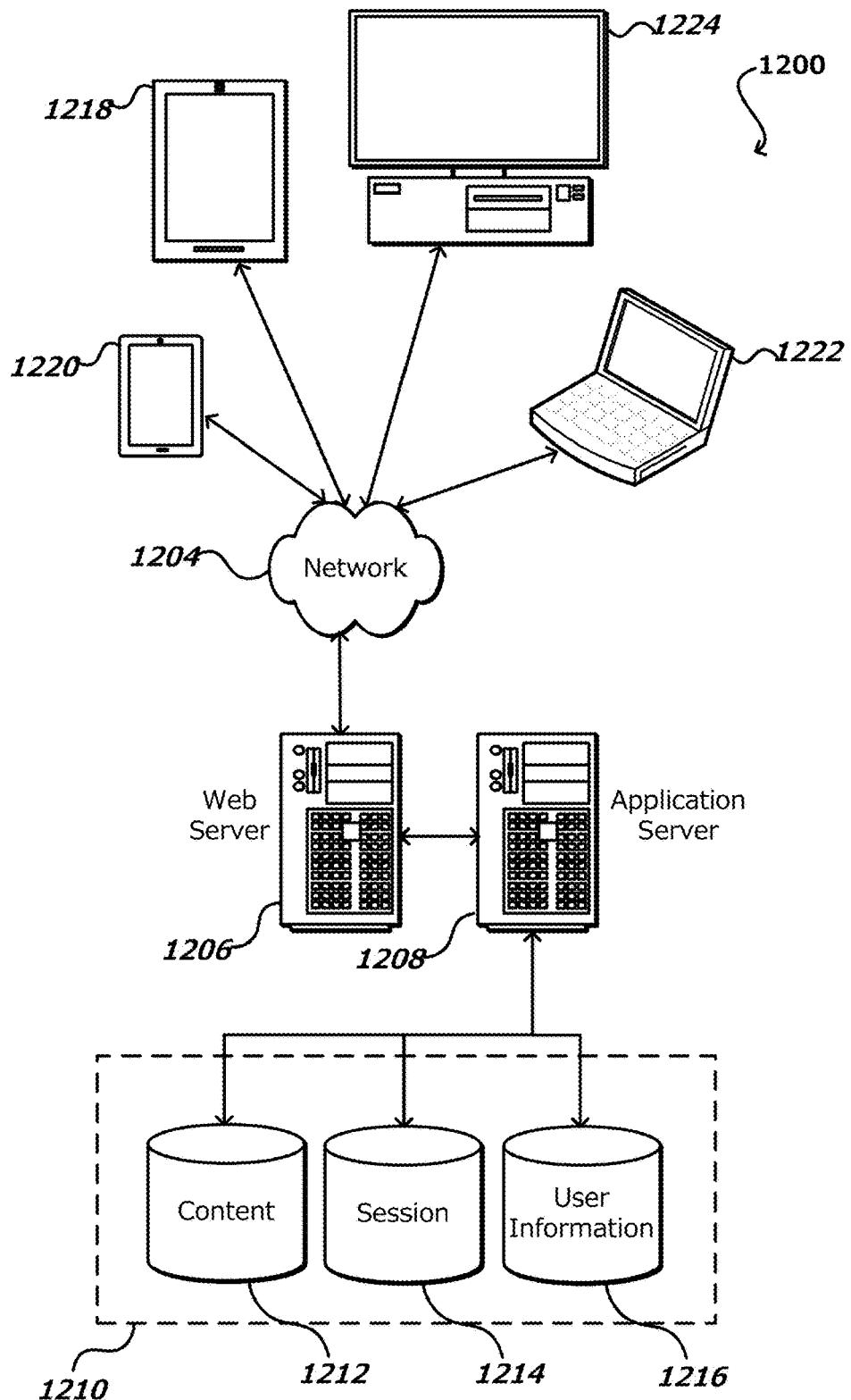
FIG. 12 illustrates an example of an environment for implementing aspects in accordance with various embodiments.

FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes electronic client devices 1218, 1220, 1222, and 1224, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client devices 1218, 1220, 1222, and 1224 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1218, 1220, 1222 and 1224. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Various systems, devices, methods, and approaches described herein may be implemented on one or more general-purpose and/or specific computing devices, such as under the control of one or more computer systems configured with executable instructions, the computer systems for example having one or more processors which may be communicatively coupled to other components such as one or more memory units that may store the instructions for execution. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a plurality of instances of image data, each instance of image data representing an object, each instance of image data being captured from a viewpoint of a plurality of viewpoints;
receiving triangular mesh data corresponding to a three-dimensional (3D) representation of the object;
receiving a request to generate a 3D rendering of the object, the 3D rendering corresponding to a requested viewpoint, the requested viewpoint not included in the plurality of viewpoints;
determining a triangle of the triangular mesh data, the triangle being viewable from the requested viewpoint;
determining at least a first instance of the plurality of instances of image data and a second instance of the plurality of instances of image data corresponding, at least in part, to the requested viewpoint, the triangle being represented, at least in part, in the first instance of the plurality of instances of image data and the second instance of the plurality of instances of image data, the first instance of the plurality of instances of image data corresponding to a first viewpoint of the plurality of viewpoints and the second instance of the image data corresponding to a second viewpoint of the plurality of viewpoints;
generating respective modified versions of the first and second instances of the plurality of instances of image data based at least in part on a transformation process to map images on a shared coordinate system, the transformation process comprising:
projecting the triangle of the triangular mesh data from the requested viewpoint onto the first instance of the plurality of instances of image data and the second instance of the plurality of instances of image data;
determining a mapping between the first instance of the image data and the requested viewpoint, the mapping providing a correspondence between pixel coordinates of the representation of the triangle data in the first instance of the image data and the requested viewpoint;
determining a mapping between the second instance of the image data and the requested viewpoint, the mapping providing a correspondence between pixel coordinates of the representation of the triangle data in the second instance of the image data and the requested viewpoint;
determining, using a feature extraction algorithm, content of the triangle at the first instance of the plurality of instances of image data and the second instance of the plurality of instances of the image data; and comparing one or more pixel locations corresponding to the triangle represented in the requested viewpoint to pixels coordinates corresponding to the content of the first instance of the plurality of instances of image data and the second instance of the plurality of instances of the image data; and generating a texture for the 3D rendering of the object at the requested viewpoint by projecting the content from the first instance of the plurality of instances of image data and the content from the second instance of the plurality of instances of image data onto a target pixel coordinate of the triangle of the triangular mesh data, the target pixel coordinate corresponding to the pixel coordinates of the content as the content appears in the requested viewpoint.

2. The computer-implemented method of claim 1, wherein generating a texture for the 3D rendering further comprises:

determining a first distance between the requested viewpoint and the first viewpoint of the plurality of viewpoints;

determining a second distance between the requested viewpoint and the second viewpoint of the plurality of viewpoints;

determining, based on a comparison of the first distance and the second distance, a first blending weight associated with the content from the first instance and a second blending weight associated with the content from the second instance; and generating the texture for the 3D rendering of the object, wherein the texture is generated based on blended properties of the content from the first instance and content from the second instance, the content from the first instance represented in the blended properties according to the first blending weight and the content from the second instance represented in the blended properties according to the second blending weight.

3. The computer-implemented method of claim 2, further comprising:

receiving a second request to generate a 3D rendering of the object, the 3D rendering corresponding to a second requested viewpoint, the second requested viewpoint not included in the plurality of viewpoints;

comparing the first requested viewpoint to the second requested viewpoint;

determining that the second requested viewpoint is closer to the second viewpoint of the plurality of viewpoints than the first viewpoint of the plurality of viewpoints; and determining, based on the determination, an adjustment to the first blending weight and the second blending weight.

4. The computer-implemented method of claim 2, further comprising:

determining a first set of vector fields for the first instance of the image data and a second set of vector fields for the second instance of image data;

determining a combined vector field, based on a linear combination of the first set of vector fields and the second set of vector fields, as modified by the first blending weight and the second blending weight; and wherein the modified version of the first instance of the image data and the second instance of image data are additionally based on the combined vector field.

5. A computer implemented method, comprising:

receiving a first instance of image data of an object corresponding to a first viewpoint and a second instance of the image data of the object corresponding to a second viewpoint;

receiving a request to generate a 3D rendering of the object from a requested viewpoint, the requested viewpoint being between the first viewpoint and the second viewpoint;

generating, based at least in part on the first viewpoint, a modified second instance of the image data, wherein at least a portion of the second viewpoint is visible from the first viewpoint;

determining a first mapping between a portion of the modified second instance of image data and a corresponding portion of the first instance of image data, the first mapping corresponding to relative locations of identified pixels between the modified second instance of image data and the first instance of the image data;

generating, based on the first mapping, a modified first instance of image data;

determining a feature associated with each of the modified first instance of image data and the modified second instance of image data;

comparing one or more pixel locations corresponding to the feature in the requested viewpoint to pixel coordinates corresponding to the feature in the first instance and to the feature in the second instance, and generating a texture for the 3D rendering based on the feature associated with each of the modified first instance of image data and the modified second instance of image data that translates the identified pixels to a shared coordinate system as the content appears in the requested viewpoint.

6. The computer implemented method of claim 5, further comprising:

receiving geometric mesh data corresponding to a 3D representation of the object; and determining a target portion of the geometric mesh viewable from the requested viewpoint, wherein the portion of the first instance of image data and the portion of the second instance of image data correspond to the target portion of the geometric mesh.

7. The computer implemented method of claim 5, wherein generating a texture for the 3D rendering further comprises:

determining a first weight factor for the feature associated with the modified first instance of image data;

determining a second weight factor for the feature associated with the modified second instance of image data; and generating the texture based on a combination of the feature associated with the modified first instance of image data and the feature associated with the modified second instance of image data, wherein the feature associated with the modified first instance of image data and the feature associated with the modified second instance of image data are each represented in the combination according to the first and second weight factors, respectively.

8. The computer implemented method of claim 7, further comprising:

determining a first distance between the first viewpoint and the requested viewpoint;

determining a second distance between the first viewpoint and the requested viewpoint;

determining the first weight factor based on the first distance; and determining the second weight factor based on the second distance.

9. The computer implemented method of claim 5, further comprising:
   determining that the first viewpoint and the requested viewpoint are aligned; and
   generating the texture for the 3D rendering based on a feature associated with the first instance of image data.

10. The computer implemented method of claim 5, wherein features associated with the modified first instance of image data and corresponding features associated with the modified second instance of image data are located at substantially similar pixel locations of the respective instances of image data.

11. The computer implemented method of claim 5, wherein the first viewpoint, the second viewpoint, and the requested viewpoint each represent differing viewpoints.

12. The computer implemented method of claim 5, wherein the features are determined using a feature extraction algorithm, and wherein the feature extraction is at least one of Scale-invariant feature transform (SIFT), Speeded Up Robust Features (SURF), or Accumulated Signed Gradient (ASG).

13. A computing device, comprising:
    at least one processor;
    memory including instructions that, when executed by the processor, cause the computing device to:
      receive a first instance of image data of an object corresponding to a first viewpoint and a second instance of image data of the object corresponding to a second viewpoint;
      receive a request to generate a 3D rendering of the object from a requested viewpoint, the requested viewpoint being between the first viewpoint and the second viewpoint;
      generate, based on the first viewpoint, a modified second instance of the image data, wherein at least a portion of the second viewpoint is visible from the first viewpoint;
      determine a first mapping between a portion of the modified second instance of image data and a corresponding portion of the first instance of image data, the first mapping corresponding to relative locations of identified pixels between the modified second instance of image data and the first instance of the image data;
      generate, based on the first mapping, a modified first instance of image data;
      determine a feature associated with each of the modified first instance of image data and the modified second instance of image data;
      comparing one or more pixel locations corresponding to the feature in the requested viewpoint to pixel coordinates corresponding to the feature in the first instance and to the feature in the second instance, and
      generate a texture for the 3D rendering based on the feature associated with each of the modified first instance of image data and the modified second instance of image data that translates the identified pixels to a shared coordinate system as the content appears in the requested viewpoint.

14. The computing device of claim 13, wherein the instructions, when executed, further cause the computing device to:
    receive geometric mesh data corresponding to a 3D representation of the object;
    determine a target portion of the geometric mesh viewable from the requested viewpoint, wherein the portion of the first instance of image data and the portion of the second instance of image data correspond to the target portion of the geometric mesh.

15. The computing device of claim 13, wherein the instructions, when executed, further cause the computing device to:
    determine a first weight factor for the feature associated with the modified first instance of image data;
    determine a second weight factor for the feature associated with the modified second instance of image data; and
    generate the texture based on a combination of the feature associated with the modified first instance of image data and the feature associated with the modified second instance of image data, wherein the feature associated with the modified first instance of image data and the feature associated with the modified second instance of image data are each represented in the combination according to the first and second weight factors, respectively.

16. The computing device of claim 15, wherein the instructions, when executed, further cause the computing device to:
    determine a first distance between the first viewpoint and the requested viewpoint;
    determine a second distance between the first viewpoint and the requested viewpoint;
    determine the first weight factor based on the first distance; and
    determine the second weight factor based on the second distance.

17. The computing device of claim 13, wherein the instructions, when executed, further cause the computing device to:
    determine that the first viewpoint and the requested viewpoint are aligned; and
    generate the texture for the 3D rendering based on a feature associated with the first instance of image data.

18. The computing device of claim 13, wherein features associated with the modified first instance of image data and corresponding features associated with the modified second instance of image data are located at substantially similar pixel locations of the respective instances of image data.

19. The computing device of claim 13, wherein the first viewpoint, the second viewpoint, and the requested viewpoint each represent differing viewpoints.

20. The computing device of claim 13, wherein the features are determined using a feature extraction algorithm, and wherein the feature extraction is at least one of Scale-invariant feature transform (SIFT), Speeded Up Robust Features (SURF), or Accumulated Signed Gradient (ASG).

* * * * *